(12) United States Patent
Morgan

(10) Patent No.: US 9,297,527 B2
(45) Date of Patent: Mar. 29, 2016

(54) LED RETROFITTING SYSTEM FOR POST TOP OUTDOOR LIGHTING

(71) Applicant: Sensity Systems, Inc., Sunnyvale, CA (US)

(72) Inventor: Dan E. Morgan, San Jose, CA (US)

(73) Assignee: Sensity Systems, Inc., Sunnyvale, CA (US)

( * ) Notice: Subject to any disclaimer, the term of this patent is extended or adjusted under 35 U.S.C. 154(b) by 125 days.

(21) Appl. No.: 13/859,432

(22) Filed: Apr. 9, 2013

(65) Prior Publication Data

US 2014/0301067 A1    Oct. 9, 2014

(51) Int. Cl.
| | |
|---|---|
| *F21S 8/08* | (2006.01) |
| *F21S 13/10* | (2006.01) |
| *F21V 29/00* | (2015.01) |
| *F21V 29/51* | (2015.01) |
| *F21V 19/00* | (2006.01) |
| *F21V 19/02* | (2006.01) |
| *F21W 111/023* | (2006.01) |
| *F21K 99/00* | (2010.01) |
| *F21V 19/04* | (2006.01) |
| *F21W 131/103* | (2006.01) |
| *F21Y 101/02* | (2006.01) |
| *F21Y 111/00* | (2006.01) |
| *F21Y 113/00* | (2006.01) |

(52) U.S. Cl.
CPC . *F21V 29/22* (2013.01); *F21S 8/08* (2013.01); *F21S 8/085* (2013.01); *F21V 19/0055* (2013.01); *F21V 19/02* (2013.01); *F21V 29/006* (2013.01); *F21V 29/20* (2013.01); *F21V 29/51* (2015.01); *F21K 9/30* (2013.01); *F21S 8/088* (2013.01); *F21V 19/04* (2013.01); *F21W 2111/023* (2013.01); *F21W 2131/103* (2013.01); *F21Y 2101/02* (2013.01); *F21Y 2111/001* (2013.01); *F21Y 2113/00* (2013.01); *Y02B 20/72* (2013.01); *Y10T 29/49716* (2015.01)

(58) Field of Classification Search
CPC ....... F21V 29/51; F21V 29/30; F21V 29/006; F21V 29/002; F21V 29/503; F21V 29/52; F21S 8/085–8/088; F21S 8/003; F21S 6/005–6/008
USPC ......................................................... 362/294
See application file for complete search history.

(56) References Cited

U.S. PATENT DOCUMENTS

| | | | |
|---|---|---|---|
| 7,329,030 B1 * | 2/2008 | Wang .............................. 362/373 |
| 7,488,093 B1 * | 2/2009 | Huang et al. .................. 362/294 |
| 2009/0225554 A1 * | 9/2009 | Chang et al. .................. 362/373 |
| 2009/0237933 A1 * | 9/2009 | Liu ........................... 362/249.02 |
| 2009/0244895 A1 * | 10/2009 | Chen ......................... 362/249.02 |
| 2011/0133623 A1 * | 6/2011 | Tsai et al. ........................ 313/46 |
| 2011/0285267 A1 * | 11/2011 | Lu et al. .......................... 313/46 |

* cited by examiner

*Primary Examiner* — Mariceli Santiago
(74) *Attorney, Agent, or Firm* — Schwegman Lundberg & Woessner, P.A.

(57) ABSTRACT

A modular lighting system for controlling light output and direction in a pole top luminaire includes a base. Lighting modules which have LEDs mounted on a heat sink include pairs of heat pipes extending from the heat sink plug into the base. Openings in the base receive the heat pipes to support the lighting modules in a desired orientation, enabling location specific customized orientation. The assembly allows universal replacement of pole top luminaires with efficient LED light engines, yet without need for custom parts, thus enabling a wide variety of applications for the lighting modules.

11 Claims, 6 Drawing Sheets

Figure 1 – Prior Art

LED RETROFITTING SYSTEM FOR POST TOP OUTDOOR LIGHTING

BACKGROUND OF THE INVENTION

The need for more energy-efficient lighting is well known. A significant fraction of the electrical power consumed in the United States is for outdoor lighting, usually for outdoor commercial and municipal lighting, notably street lighting. Reducing demand for electrical power has become important, both for conservation of resources and reduction of energy cost.

There are well-known energy-efficiency and maintenance cost issues with conventional incandescent street lighting technologies. In addition, most outdoor commercial lighting technology uses a single light source per luminaire. When the bulb is energized, light radiates in all directions. Reflectors can be used to redirect the light, however, that approach introduces undesirable losses. In addition, for different applications, different patterns of illumination may be desired. For example, in some locations it is desirable to have light emitted in all directions, while in other locations, e.g. next to a window, emitting light in all directions may be undesirable. Providing multiple types of fixtures and multiple reflectors for various locations adds to the cost of maintenance, installation and inventory.

Light emitting diode (LED) technology has progressed substantially in the last few years. The assignee here provides high-brightness white LEDs for use in commercial outdoor lighting, as well as for other applications.

One approach to reducing the cost of changing from conventional incandescent to LED lighting technology in commercial lighting applications is to retrofit existing lighting fixtures (or luminaires) by replacing the light source portion of the luminaire with an LED light source. In this approach, the bulb, reflector, socket, and associated equipment are removed from the fixture. LED light engines mounted on custom sheet metal can then be placed inside the luminaire.

While this is method reduces the direct energy costs, it still suffers from the need for expensive customization to achieve desired light distribution patterns and illumination levels. In addition the light output is limited by the ability of the customized mounting structures to dissipate heat from the LEDs. The number and type of LEDs required for enough light to replace 200 watt and larger incandescent bulbs creates sufficient heat that careful further customization is required to maintain the temperatures necessary for longer life of the LEDs themselves. As a result almost every retrofit becomes a custom design, undesirably raising its costs, and thereby lengthening the "payback" period of the investment.

BRIEF SUMMARY OF THE INVENTION

This invention enables a universal replacement solid-state lighting fixture for pole top street lamps. The fixture enables customization of the direction and extent of illumination without need for multiple fixture types. In one embodiment this modular lighting system for controlling light output and direction in a pole top luminaire includes a base into which lighting modules may be plugged. Each module includes a heat sink, at least one solid-state light source mounted on the heat sink, and typically two heat pipes extending from the heat sink. The heat pipes plug into corresponding pairs of openings on the base. By providing openings in the base in various patterns and orientations, and using a universal module upon which the LEDs are mounted, the number of modules and their orientations can be varied, enabling each replacement fixture to be adapted for particular needs at the site.

In a preferred embodiment each lighting module includes a thermally conductive heat sink. The solid-state illumination sources are implemented as LEDs mounted on a circuit board affixed to the heat sink. Each heat sink includes a pair of heat pipes affixed to the heat sink. A universal base has openings in various patterns and orientations, into which the heat pipes fit in a desired orientation to the base. The heat pipes also preferably include a cooling fluid that circulates within the pipe to transfer heat from the heat sink to the base.

To enable electrical connections to the lighting modules, the base includes an additional opening. A power supply disposed on an opposite side of the base from the lighting modules provides power and control of the LEDs using wiring which passes through the additional opening to connect the lighting modules to the power supply. A controller coupled to the power supply and each of the lighting modules enable a controlled level of electrical power to be applied to each of the modules mounted on the base.

In another embodiment a method is provided of retrofitting pole top luminaries with solid state light engines. The method includes removing any existing light source from the luminaire, then affixing a base plate to the luminaire, the base plate having a first set of openings. The solid-state lighting modules include a heat sink to which solid-state illumination sources are affixed and a pair of heat pipes extending from the heat sink. The heat pipes are adapted to plug into the first set of openings. By providing extra openings in the base, various configurations of the universal lighting modules can be enabled to suit particular locations, with differing amounts of, and directions of light.

DETAILED DESCRIPTION OF THE INVENTION

Preferred embodiments of this invention are directed to commercial outdoor lighting, and in particular, to the use of solid state lighting such as light-emitting diodes (LEDs), in a light engine to replace conventional lighting sources in a pole top street lighting fixture. The technology described herein relates to replacement of incandescent fixtures in pole top street lighting in a manner that allows for customization of the lighting output and illumination direction, without need for provision of multiple fixtures or special parts for different configurations. The technology described here allows essentially any pole top fixture to be replaced by an LED based light engine using a single design.

Figure 1:
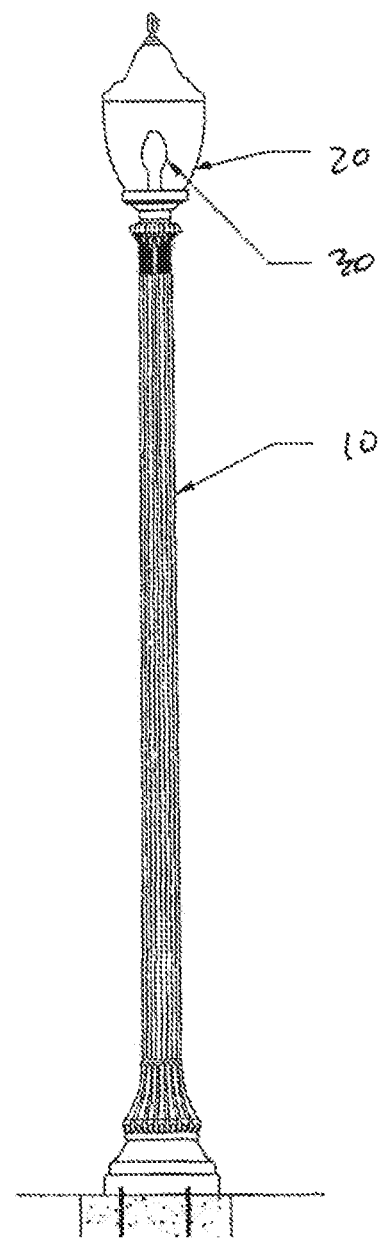
FIG. 1 is a diagram of a prior art pole top street lamp.

FIG. 1 is a diagram illustrating a conventional pole top street lighting fixture. The fixture includes a base and supporting column 10, which typically supports a glass globe 20. An incandescent bulb 30 is located within the globe 20. Street lamps such as depicted in FIG. 1 operate using conventional alternating current power supplies to drive an incandescent, or sometimes, a florescent bulb 30. As will be discussed below, preferred embodiments of this invention provide for removal and replacement of the bulb 30, its supporting base, and its socket, all with an assembly providing illumination using light emitting diodes. The components of, and the assembly, are discussed next.

Figure 2:
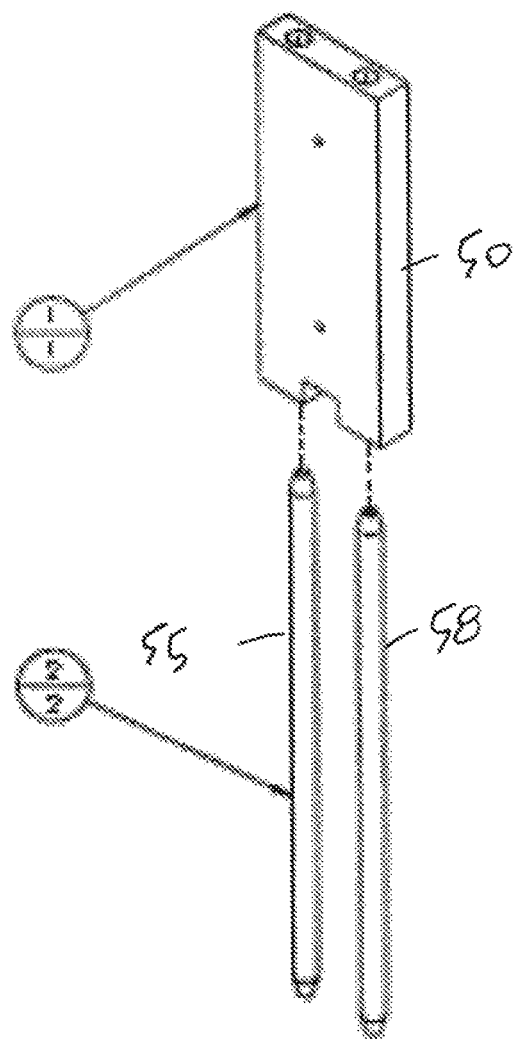
FIG. 2 illustrates a heat sink and heat pipes.

FIG. 2 is a diagram illustrating a first portion of the structure of a preferred embodiment of this invention. Depicted are a heat sink 50 to which light emitting diodes (LEDs) are affixed, and two heat pipes 55 and 58. The heat pipes conduct heat away from the heat sink 50. The heat conducting support structure 50 is preferably a solid block of material that has high thermal conductivity. In this manner, it efficiently dissipates heat produced by LEDs affixed to the heat sink 50. Typical materials, which can be employed as heat sink 50, include aluminum and copper, as well as other well-known materials or alloys.

Heat is dissipated from heat sink 50 by a pair of heat pipes 55 and 58. In the illustration only two heat pipes are used. Depending upon the thermal loading of the heat sink 50, additional heat pipes may be employed if necessary or desired. The heat pipes conduct heat away from the heat sink 52 to a supporting base as will be described below. Preferably, the heat pipes are formed of material with high thermal conductivity. While the heat pipes can be formed of a single rod of thermally conductive material, the heat pipes are preferably hollow and sealed only at the ends after being filled with a heat transfer fluid. This fluid may be a liquid or gas, for example, deionized water, methanol, or a water/methanol mixture.

The heat pipes provide a convection current of the working fluid within the pipes. Generally the working fluid within the heat pipes is heated at the portion of the pipes inserted into heat sink 50, or in close proximity thereto. In one implementation the working fluid is vaporized by being heated where it is in close contact with the heat sink 50, and then condenses back into a working fluid as it gives up heat. The internal pressure of the heat pipe can be set or adjusted to facilitate such a phase change. The fluid then returns to the warmer interface where the heat pipes are within the heat sink.

We have found that with conventional arrays of LEDs, for example, even those with substantial power consumption, it is unnecessary to provide fins or other protrusions on the heat sink 50. Of course, given the particular thermal load input on the device, other passive cooling structures, such as fins, can be added to the heat sink 50.

Figure 3:
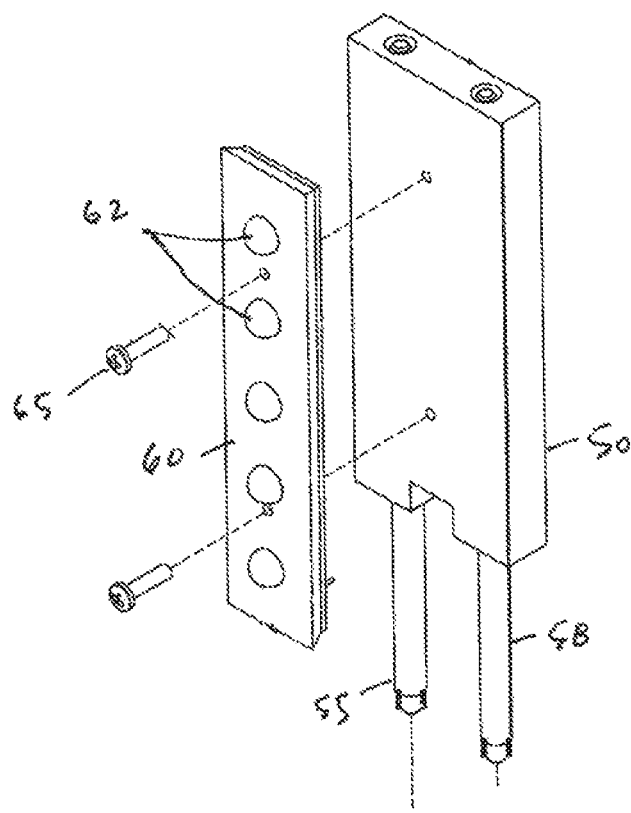
FIG. 3 illustrates attachment of a circuit board containing LEDs to the heat sink.

FIG. 3 is a diagram illustrating the heat sink 50, heat pipes 55 and 58, and a circuit board containing the LEDs 62. As illustrated, a printed circuit board 60 upon which light emitting diodes 62 have been affixed is attached to the heat sink 50. This allows heat from the diodes 62 to dissipate into the heat sink 50. From there, heat pipes 55 and 58 can dissipate the heat. This allows the heat sink to be cooled by the surrounding ambient atmosphere. The circuit board 60 of light emitting diodes 62 can be affixed to the heat sink 50 using any suitable means, for example screws 65. Five light emitting diodes 62 are illustrated on the circuit board 60, however, more or fewer LEDs, and additional circuit boards containing additional LEDs, could also be employed. Appropriate electrical wiring 68 enables electrical power to be provided to the LEDs 62.

Figure 4:
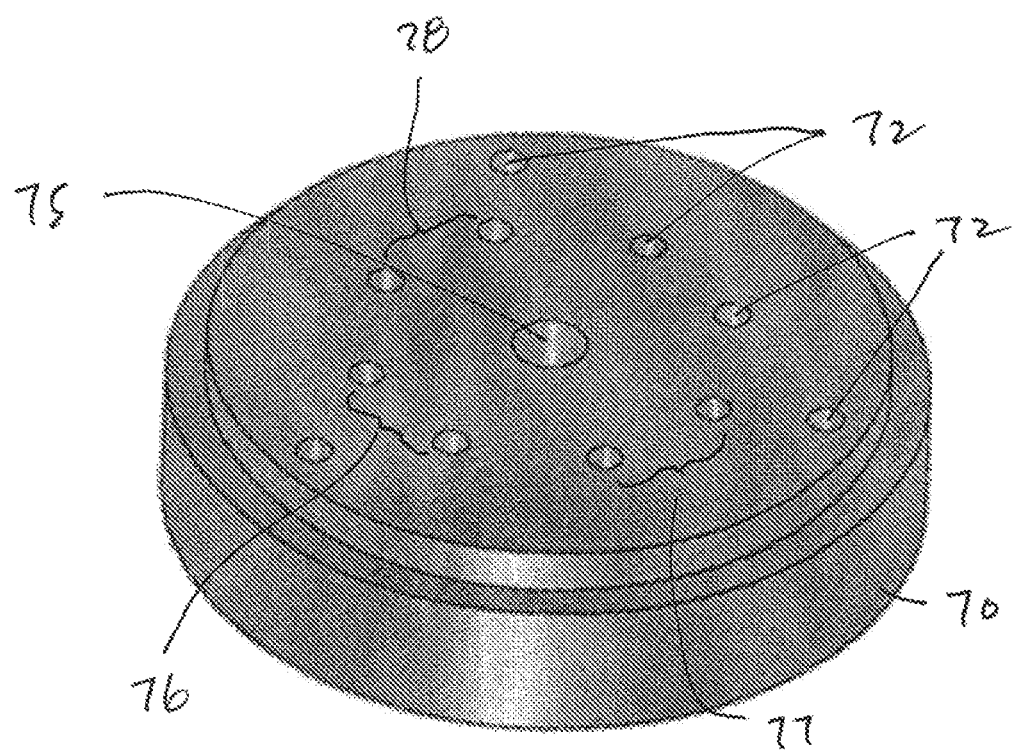
FIG. 4 illustrates a base for the assembly shown in FIG. 3.

FIG. 4 is a perspective view of a base 70 for the assembled modules illustrated in FIG. 3. As shown in FIG. 4 a base 70, preferably fabricated from thermally conductive material such as aluminum, includes a series of openings 72 and 75. Openings 72 are spaced apart with a spacing corresponding to that between the heat pipes 55 and 58 on the LED modules. Preferably there are more openings 72 than are required by the number of modules to be inserted into base 70. This enables the LED modules to be inserted into the base 70 in different orientations. These orientations allow a "universal" base to be used for differing applications, for example, applications where light is to be emitted in less than a 360-degree orientation. Base 70 also includes a central opening 75 through which electrical conductors can be provided to the LED modules.

In a typical implementation AC power supplied to the street lamp is converted to DC power by a transformer or rectifier located in the base or column of the street lamp. This DC power is supplied to a controller, and the controller then provides the desired power to the wiring associated with the individual LED assemblies 60. The controller and associated power device typically are mounted underneath base 70.

Of particular advantage here is the provision of additional sets of openings 72 in the base 70. This allows the positioning of the modules with respect to the base to be customized for the particular lighting needs at different physical locations of the street lamp. For example, if it is desired to have illumination only on opposite sides of the fixture, one LED module can be inserted into the pair of openings 77, and another LED module inserted into another pair of openings 78 on the opposite side of the base. If light is desired on three sides of the fixture, then a third module can be inserted into the pair of opening 76, as well. Alternatively, if the modules are desired to be oriented at 120° from each other, the appropriate openings can be chosen for positioning of the modules. This aspect of the preferred embodiment enables use of the same baseplate in all fixtures, yet enables providing light in customizable directions on a fixture by fixture basis, without additional cost, and without the need for custom manufacturing. In addition if it is desired to have different light intensity in different directions, modules having differing numbers of LEDs or different power LEDs can be used.

Figure 5:
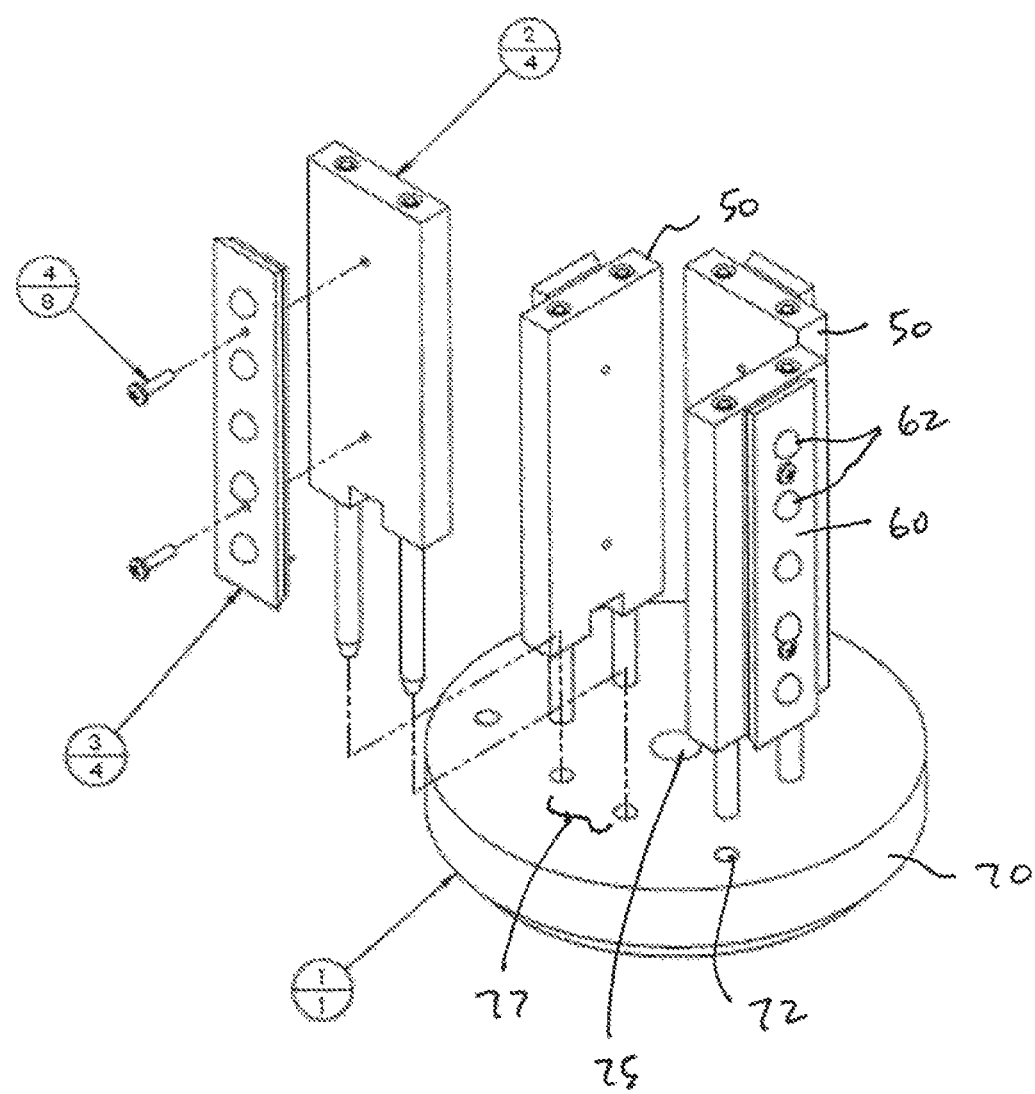
FIG. 5 illustrates the mechanical mounting of the heat sinks, heat pipes, and LEDs to provide a replacement assembly.

FIG. 5 illustrates assembly of the overall LED retrofitting system for post top outdoor lighting systems. In the illustration, component parts have been given reference numbers corresponding to those used in earlier figures. Once the LED modules are inserted into the base, the heat pipes 55 and 58 are in thermal communication with the base 70. In some embodiments, direct physical contact, e.g. a press-fit, is used between the heat pipes and the base. The heat pipes may also be attached to the base 70 by adhesives, soldering, brazing, or other well-known approaches. Furthermore, for some implementations in which there is limited space in the street lamp fixture, it may be necessary to bend the heat pipes to assure adequate clearance from the surrounding fixture walls, typically glass.

Figure 6:
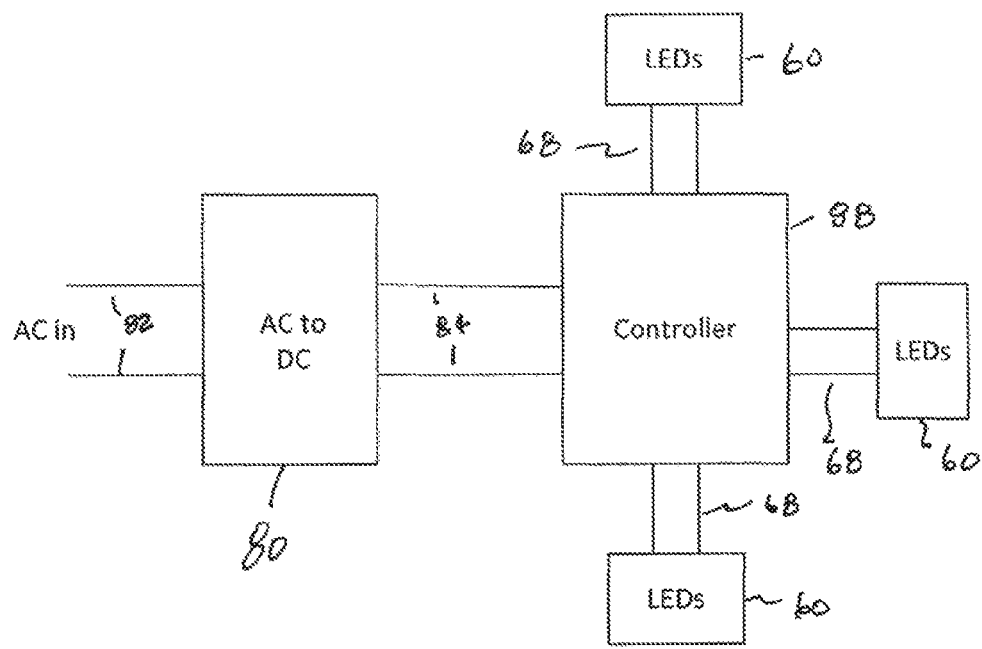
FIG. 6 is a diagram illustrating the circuitry employed in the assembly shown in FIG. 5.

FIG. 6 is a block diagram of a typical electrical circuitry used to drive the LED replacement street lamp fixture. As illustrated, AC to DC converter 80 is coupled to the existing alternating current power supply arriving on lines 82. The converter provides DC power at an appropriate potential on lines 84. The DC power is provided to an LED controller 88, which controls the LEDs 60 on the various modules. Controller 88 enables turning the LEDs off and on. The electrical connections 68 from the controller 88 pass up through the center opening 75 in the base 70 enabling them to be coupled to each of the LED modules. The controller may also be coupled to a control system, for example, a wireless network, enabling control of the lamp from a remote location.

While preferable embodiments of the invention have been shown and described herein, these embodiments are provided by way of example only. Variations, changes, and substitutions can be made without departing from the scope of the invention. For example, using the techniques described, LED retrofitting can be done for other types of fixtures such as interior lighting fixtures or suspended lighting fixtures.

What is claimed is:

1. A modular lighting system for controlling light output and direction in a pole top luminaire comprising:
   a base;
   a first plurality of lighting modules each including
      a heat sink;
      at least one solid state illumination source mounted on the heat sink;
      at least one heat pipe coupled to the heat sink and extending away from the heat sink; and wherein
   the base includes a second plurality of openings therein adapted to receive the heat pipes of the first plurality of lighting modules, the second plurality of openings positioned to enable customizable positioning of each of the lighting modules to emit light from different directions from the pole top luminaire.

2. The modular lighting system of claim 1, wherein:
   each lighting module includes a thermally conductive block of material;
   the solid state illumination source comprises at least one LED mounted on a circuit board; and
   the circuit board is affixed to the heat sink.

3. The modular lighting system of claim 2, wherein:
   the at least one heat pipe includes two heat pipes spaced apart from one another by a distance x; and
   the second plurality of openings includes y pairs of openings, the openings in each pair being spaced apart by the distance x.

4. The modular lighting system of claim 3, wherein the y pairs is greater than the first plurality of lighting modules.

5. The modular lighting system of claim 3, wherein each heat pipe has a cross-sectional configuration and each opening in the second plurality of opening has a same cross-sectional configuration.

6. The modular lighting system of claim 3, wherein:
   the base includes an additional opening;
   a power supply for the lighting modules is disposed on an opposite side of the base from the lighting modules; and
   an electrical connection between the power supply and the lighting modules extends through the additional opening to connect the lighting modules to the power supply.

7. The modular lighting system of claim 6, further including a controller coupled between the power supply and each of the plurality of lighting modules.

8. The modular lighting system of claim 3, wherein the second plurality of openings enables the lighting modules to be positioned around the base with the LEDs facing outward.

9. The modular lighting system of claim 6, wherein each of the heat pipes includes a heat conducting fluid.

10. The modular lighting system of claim 1, wherein a number of the second plurality of openings being larger than a number of heat pipes associated with the plurality of lighting modules to enable the customizable positioning of each of the lighting modules on the base in varying orientations to emit light in different directions from the pole top luminaire.

11. The modular lighting system of claim 1, wherein the second plurality of openings is positioned to enable configuration of the plurality of lighting modules up to a 360-degree orientation.

* * * * *